April 30, 1957  P. J. McLAUGHLIN ET AL  2,790,735
COATED PAPER PRODUCTS AND METHODS OF MAKING THEM
Filed Jan. 31, 1955

Mineral—Coating Comprising
(1) Mineral (Predominantly Clay) and
(2) Binder of Salt of a Copolymer of 4%–7% of Acrylic or Methacrylic Acid Having a $T_i$ Value Not Over 20°C.

United States Patent Office 2,790,735
Patented Apr. 30, 1957

2,790,735

COATED PAPER PRODUCTS AND METHODS OF MAKING THEM

Paul J. McLaughlin, Moorestown, N. J., and Benjamin B. Kine, Levittown, Pa., assignors to Rohm & Haas Company, Philadelphia, Pa., a corporation of Delaware Application January 31, 1955, Serial No. 485,327

15 Claims. (Cl. 117—155)

This invention relates to mineral-coating compositions and to paper coated therewith. Mineral-coating compositions, such as are commonly applied to paper body stock in the manufacture of mineral coated paper and the like, comprise aqueous suspensions of finely divided mineral matter, referred to herein as pigment, such as clay, calcium carbonate, blanc fixe, finely divided metals such as aluminum, color lakes, tinctorial oxides, or the like and an aqueous dispersion or solution of an adhesive such as casein, glue, starch, or the like.

In general, mineral coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e. g. so that it will not be removed by the pull of printing ink during the printing operation. Nevertheless, the particular adhesive used does have considerable influence upon the working qualities of the coating composition; e. g., viscosity, flow, spreadability, etc. Likewise the adhesive used in the coating composition has a definite effect upon the quality and appearance of the finished coated paper made therewith.

For example, the plasticity of the adhesive has a pronounced effect on the ability of the supercalendar to produce a level and good printing surface.

It has heretofore been suggested to employ pigmented aqueous dispersions of such synthetic resinous polymers as polymerized methyl acrylate, ethyl acrylate or butyl acrylate, or methyl, ethyl or butyl acrylate copolymerized with acrylonitrile or ethyl, methyl or butyl methacrylate. However, such polymers have been found to be insufficiently adherent to the paper to reliably resist being pulled up by the ink during printing operations.

Figure 1:
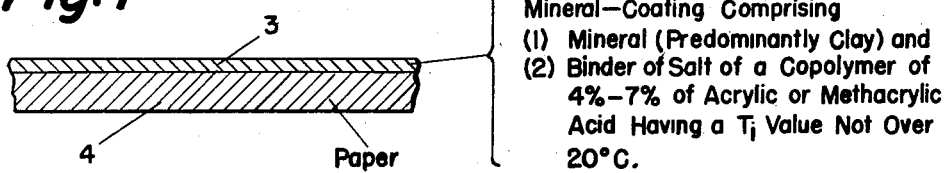
Figure 2:
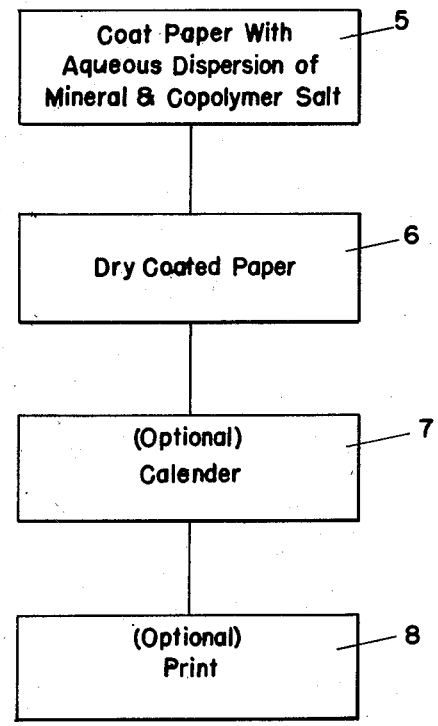

In the drawing, Fig. 1 is a diagrammatic cross-sectional view, much enlarged, of a coated paper of the present invention, and Fig. 2 is a flow diagram illustrating the process of coating in accordance with the present invention.

It has now been found that there are two factors that are essential to provide good printing behavior in coatings formed with pigmented aqueous dispersions of emulsion polymers. In the first place, the polymer must be soft enough to flow around the pigment particles and come into good conformity to the cellulose surface under the temperature conditions and in the very short time between application of the coating and drying thereof on the paper machine. This period is generally of the order of 20 to 60 seconds on conventional coating machines, such as the Champion type of coater, and the temperature ranges from 20° C. to 85° C. during such period. To provide this softness, the second order transition temperature, or $T_i$ as defined hereinbelow, should not be over 20° C. It may range from about −45° C. up and is preferably in the range of −10° C. to +10° C.

The $T_i$ value referred to is the transition temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The second essential requirement is to include 4% to 5% by weight of acrylic acid or methacrylic acid or salts thereof in the copolymer. It has been found that this proportion of carboxylate groups (which may be designated —COOM-containing groups in which M represents H, an alkali metal, such as potassium, sodium or lithium, the ammonium radical (NH$_4$) or the salt group formed by a water-soluble amine, such as methylamine, ethylamine, or any one of the ethanolamines, such as triethanolamines) imparts a marked adhesiveness of the copolymer to the paper surface, apparently because of some specific adhesion between such groups and the cellulose molecules of the paper fibers. Copolymers containing appreciably less than 4% by weight of acrylic or methacrylic acid fail to show any marked adhesion toward the paper. On the other hand, the acrylic or methacrylic acid may be increased to 7% without either loss or improvement in this adhesive quality. However, copolymers containing 4% to 5% are preferred because the marked improvement in adhesion to the paper is obtained without rendering the coating too sensitive to water for many practical purposes.

The amount of the binder in such coatings is from 8% to 25% by weight of the pigment, and is preferably 12% to 20% by weight thereof. In accordance with the present invention, the copolymers containing the polymerized acid or salt thereof generally constitute the entire binder of the coating composition, though the copolymers may be combined with other binder materials provided the copolymers are used in predominating proportions. It is because of the low proportion of binder relative to pigment in these coating compositions that it is so important to have not only good flow of the copolymer but also specific adhesion to the paper which properties are obtained by the selection of $T_i$ values and the introduction of COOM groups in the copolymer.

The pigments that may be employed include clays, especially of the kaolin type, calcium carbonate, blanc fixe, talc, titanium dioxide, colored lakes and toners, ochre, carbon black, graphite, aluminum powder or flakes, chrome yellow, molybdate orange, toluidine red, copper phthalocyanines, such as the "Monastral" blue and green lakes. The term "mineral" in the claims in intended to cover all such types of pigmentary matter whether of strictly mineral character or partly of organic material.

Copolymers in accordance with the present invention include those obtained by the copolymerization of one or more of the lower alkyl acrylates in which the alkyl groups may have 1 to 4 carbon atoms with 4% to 7%, preferably 4% to 5%, by weight of acrylic acid or methacrylic acid, or of a mixture of these acids. The $T_i$ values of all such copolymers, namely those of the methyl, ethyl, propyl, and butyl acrylates are within the range above specified to provide the softness required for the present invention. In fact, they are of such softness that substantial amounts of hardening comonomers may be introduced into such copolymers without causing the $T_i$ value to rise above the maximum permissible value of 20° C. Examples of such hardening comonomers include the lower alkyl methacrylates in which the alkyl group may have 1 to 4 carbons namely the methyl, ethyl, propyl, and butyl methacrylates, styrene, acrylonitrile, methacrylonitrile, vinyl chloride, vinylidene chloride and the like. The amount of hard comonomer that may be copolymerized with one of the soft monomers above depends upon the particular hard and soft comonomers to be copolymerized. The following list gives for several typical copolymer systems approximately the maximum amount of a particular hard comonomer that may be used with a particular soft comonomer to provide copolymers which have $T_1$ values of about 10° C. and lower. They are accordingly within the preferred range cited above and somewhat more of the hard comonomer could be used to provide copolymers which are still within the maximum scope of the invention as defined by the upper $T_1$ limit of 20° C. For example, a copolymer of 64% by weight ethyl acrylate, 31% of methyl methacrylate and 5% of methacrylic acid has a $T_1$ of about 20° C. In the list, "acid" refers to acrylic, methacrylic, or a mixture of these acids:

Methyl acrylate 70, ethyl acrylate 25, acid 5
Ethyl acrylate 76, methyl methacrylate 19, acid 5
Ethyl acrylate 78, styrene 17, acid 5
Ethyl acrylate 78, acrylonitrile 17, acid 5
Ethyl acrylate 20, butyl methacrylate 75, acid 5
n-Propyl acrylate 62, methyl methacrylate 33, acid 5
n-Propyl acrylate 72, acrylonitrile 23, acid 5
Butyl acrylate 58, methyl methacrylate 37, acid 5
Butyl acrylate 68, acrylonitrile 27, acid 5
Butyl acrylate 10, butyl methacrylate 85, acid 5
Butyl acrylate 57, styrene 38, acid 5

The copolymer dispersions may be made by any of the known emulsion copolymerization procedures, e. g. by first mixing the several monomers in the desired proportions into an aqueous solution of an anionic, or preferably a non-ionic, dispersing or emulsifying agent.

Examples of anionic emulsifying agents that may be used include the higher fatty alcohol sulfates, such as sodium lauryl sulfate, the alkylaryl sulfonates, such as sodium t-octylphenyl sulfonates, the sodium di-octyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-changed carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% or 70% of the resinous copolymer on a weight basis. It is, however, more practical—hence preferred—to produce dispersions which contain about 30% to 50% resin-solids.

The pigment or pigments are preferably mixed and dispersed in a small amount of water before mixing with the copolymer dispersion. When clay is used as a part of the pigment, and in preferred embodiments it forms a predominant proportion of the pigment, the dispersion is preferably adjusted to a pH of 8.5 to 9.5 to obtain the optimum dispersion of the clay.

After combining the pigment and copolymer dispersions, the resulting coating composition is applied to the paper or paperboard at a total solids concentration of at least 40% and preferably 60% to 70% by any suitable equipment, such as immersion roll and doctor system, gravure roller system, brush coater, or spray coater. It may be applied to the paper after drying, and/or conditioning. Alternatively it may be applied during the first drying operation on the paper where it has undergone only partial drying. For example, the coating system may be mounted at an intermediate point in the drier on the paper-making machine, such as at a point where the paper has been reduced to approximately 50% moisture content.

After the coating operation, the coated sheet is dried and may then be calendered, and subsequently printed. The drying may be the usual type provided in which air at about 230° to 260° F. (110° to 130° C.) is directed against the paper for thirty to forty-five seconds. The paper and coating may reach a temperature of about 180° F. (ca. 85° C.) during the drying operation. Painting may be effected by the conventional inks of precipitation type or heat-setting type including those based on drying oils. The coated products of the present invention are receptive to single color inks and multi-color inks of graded viscosity and are able to withstand the pull of such inks. It may be overcoated, after printing, with wax, lacquer, or other compositions.

Fig. 1 shows a paper base 4 carrying a coating 3 on one surface thereof. The coating is obtained as illustrated in the flow diagram of Fig. 2 by applying to the sheet 4 (in step 5) an aqueous dispersion of the salt of a copolymer of one of the acids mentioned above which contains a pigment or mineral component which is predominantly clay, drying the coated paper (step 6), optionally calendering (step 7) and optionally printing (step 7).

In the following examples which are illustrative of the present invention, the parts and percentages are by weight unless otherwise noted. The ink numbers referred to designate the inks of the Institute of Printing having graded tackiness increasing from No. 1 to No. 6.

*Example 1*

Eighty parts of fine coating clay (kaolin), 20 parts of titanium dioxide, 0.2 parts of sodium hexametaphosphate were mixed in 48 parts of water, and 0.2% (on the weight of clay) of sodium hydroxide was added to adjust the pH to 9. The mixture thus obtained was added to 25 parts of an aqueous dispersion of a copolymer having a $T_i$ of about 20° C. obtained by the emulsion copolymerization of a mixture of 64 parts of ethyl acrylate, 31 parts of methyl methacrylate, and 5 parts of methacrylic acid in about 100 parts of water in the presence of 6 parts of a t-octylphenoxypolyethoxyethanol containing about thirty oxyethylene units and a catalyst such as small amounts of ammonium persulfate and sodium hydrosulfite. After polymerization, sodium hydroxide was added to adjust the composition to a pH of 9.

A dry chipboard (0.017 inch thick) was then coated with the composition (which contained 12% of copolymer on the weight of pigment) by means of a No. 12 wire-wound rod. About 5 to 6 pounds of the coating composition (dry weight) per 1000 sq. ft. of the board was thus applied to one surface. The coated board was dried in an oven by air heated at 185° F. for a period of 45 to 60 seconds. It was then calendered by rolls at room temperature at a pressure of 50 lbs./lineal inch. The coated board had a good, smooth surface highly receptive to ink and resistant to pick (that is removal) by inks having a tack corresponding to No. 4.

*Example 2*

The procedure of Example 1 was followed except that the copolymer was replaced by the same proportion of a copolymer of 77% ethyl arcylate, 18% methyl methacrylate and 5% of methacrylic acid having a $T_i$ of 6° C. The coated board had even better resistance to pick during printing, no pick being encountered even with a No. 5 ink.

*Example 3*

The procedure of Example 1 was repeated except that the copolymer was replaced with a copolymer of 87% ethyl acrylate, 8% methyl methacrylate, and 5% methacrylic acid having a $T_i$ of —3° C. The coated board was similar to that of Example 2. The board itself failed before the coating was removed on increasing the tack of the ink beyond No. 6.

*Example 4*

The procedure of Example 1 was repeated except that the copolymer was replaced with a copolymer of 76% of butyl acrylate, 19% of acrylonitrile, and 5% of methacrylic acid and the amount of copolymer was reduced from 12% to 10% by weight of the pigment. The coated board was similar to that obtained in Example 2.

Coatings obtained in which the proportion of this copolymer was raised from 12% to 16% of the pigment showed only a slight pick when a No. 6 ink was applied in printing.

When this copolymer was increased to 20% of the pigment, no pick occurred even with a No. 6 ink. With inks No. 7 and 8, board failure occurred.

*Example 5*

Example 1 was repeated substituting for the copolymer there used a copolymer of 96% ethyl acrylate and 4% methacrylic acid having a $T_i$ of about —12° C. A No. 4 ink showed only a slight pick of the coating.

*Example 6*

Example 1 was repeated substituting for the copolymer there used a copolymer of 92% ethyl acrylate, 4% methyl methacrylate, and 4% of methacrylic acid having a $T_i$ of —8° C. A No. 6 ink showed only a slight pick of the coating.

*Example 7*

Example 1 was repeated with the copolymer replaced successively by (a) a copolymer of 87% ethyl acrylate, 9% methyl methacrylate, and 4% of methacrylic acid having a $T_i$ of about —3° C.; (b) a copolymer of 83% ethyl acrylate, 13% of methyl methacrylate, and 4% of methacrylic acid having a $T_i$ of 1° C.; (c) a copolymer of 77% ethyl acrylate, 19% methyl methacrylate, and 4% of methacrylic acid having a $T_i$ of 7° C. A No. 4 ink showed only a negligible amount of pick in each case.

*Example 8*

A coated board was obtained by the procedure of Example 1 except the copolymer was replaced with a copolymer of 70% butyl acrylate, 25% styrene and 5% methacrylic acid having a $T_i$ of about —5° C. Negligible pick occurred with a No. 4 ink.

By increasing the proportion of copolymer from 12% to 21% of the pigment, a coated board was obtained showing no pick even with a No. 6 ink.

*Example 9*

Coated boards were produced by repeating Example 1 except for the replacement of the copolymer there used by each of the following copolymers in succession:

(a) A copolymer of 15% of butyl acrylate, 80% of butyl methacrylate, and 5% of acrylic acid.
(b) A copolymer of 66% propyl acrylate, 30% of ethyl methacrylate and 4% of acrylic acid.
(c) A copolymer of 10% of methyl acrylate, 65% of methacrylonitrile, and 4.5% of acrylic acid.
(d) A copolymer of 93% of methyl acrylate, 3% of acrylic acid, and 4% of methacrylic acid.

Each of the boards showed no pick with a No. 3 ink and only a negligible pick with a No. 4 ink. When the proportions of the copolymer were raised from 12% to 20%, on pigment weight, negligible pick was obtained even with a No. 6 ink.

In the claims, the term "paper" is intended to include not only thin flexible paper webs or sheets, but also board types of paper fibers, whether flexible or stiff.

It is to be understood that changes and variations may be made without departing from the spirit and scope of the invention as defined by the appended claims.

We claim:

1. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of a salt of a copolymer of at least one lower alkyl acrylate in which the alkyl group has from 1 to 4 carbon atoms with 4% to 7% by weight in the copolymer of at least one acid, selected from acrylic acid and methacrylic acid, said copolymer having a $T_i$ value not over 20° C.

2. A coated paper as defined in claim 1 in which the copolymer also comprises a hardening comonomer selected from the group consisting of a lower alkyl methacrylate in which the alkyl group has from 1 to 4 carbon atoms, styrene, acrylonitrile, methacrylonitrile, vinyl chloride, and vinylidene chloride.

3. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 12 to 20 parts by weight of a salt of a copolymer of at least one lower alkyl acrylate in which the alkyl group has from 1 to 4 carbon atoms with 4% to 7% by weight in the copolymer of at least one acid selected from acrylic acid and methacrylic acid, said copolymer having a $T_i$ value not over 20° C.

4. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 12 to 20 parts by weight of a salt of a copolymer of at least one lower alkyl acrylate in which the alkyl group has from 1 to 4 carbon atoms with 4% to 7% by weight in the copolymer of at least one acid selected from acrylic acid and methacrylic acid, said copolymer having a $T_i$ value between —45° C. and 20° C.

5. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 12 to 20 parts by weight of a salt of a copolymer of at least one lower alkyl acrylate in which the alkyl group has from 1 to 4 carbon atoms with 4% to 7% by weight in the copolymer of at least one acid selected from acrylic acid and methacrylic acid, said copolymer having a $T_i$ value between —10° C. and 10° C.

6. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of an alkali metal salt of a copolymer of at least about 64% of ethyl acrylate, from 0 to 32% of methyl methacrylate and 4% to 7% of methacrylic acid, the copolymer having a $T_i$ value not over 20° C.

7. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of an alkali metal salt of a copolymer of at least about 78% of ethyl acrylate, from 0 to 17% of acrylonitrile and 4% to 7% of methacrylic acid, the copolymer having a $T_i$ value not over 20° C.

8. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of an alkali metal salt of a copolymer of at least about 78% of ethyl acrylate, from 0 to 18% of styrene and 4% to 7% of methacrylic acid, the copolymer having a $T_i$ value not over 20° C.

9. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of an alkali metal salt of a copolymer of 64% of ethyl acrylate, 31% of methyl methacrylate, and 5 parts of methacrylic acid, the copolymer having a $T_i$ value not over 20° C.

10. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of an alkali metal salt of a copolymer of 76% of butyl acrylate, 19% of acrylonitrile, and 5% of methacrylic acid, the copolymer having a $T_i$ value not over 20° C.

11. A mineral coated paper product comprising a paper sheet carrying on a surface thereof a coating comprising (1) a finely divided pigmentary material having a predominant proportion of clay therein and (2) a binder comprising for each 100 parts by weight of the pigment, from 8 to 25 parts by weight of an alkali metal salt of a copolymer of 70% of butyl acrylate, 25% of styrene, and 5% of methacrylic acid, the copolymer having a $T_i$ value not over 20° C.

12. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 8% to 25%, on the total weight of the pigment, of a salt of a copolymer of at least one lower alkyl acrylate in which the alkyl group has from 1 to 4 carbon atoms with 4% to 7% by weight in the copolymer of at least one acid selected from acrylic acid and methacrylic acid, said copolymer having a $T_i$ value not over 20° C., drying, and calendering the coated sheet.

13. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 12% to 20%, on the total weight of the pigment, of a salt of a copolymer of at least one lower alkyl acrylate in which the alkyl group has from 1 to 4 carbon atoms with 4% to 7% by weight in the copolymer of at least one acid selected from acrylic acid and methacrylic acid, said copolymer having a $T_i$ value not over 20° C., drying, and calendering the coated sheet.

14. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 12% to 20%, on the total weight of the pigment, of a salt of a copolymer of at least one lower alkyl acrylate in which the alkyl group has from 1 to 4 carbon atoms with 4% to 7% by weight in the copolymer of at least one acid, selected from acrylic and methacrylic acid, said copolymer having a $T_i$ value between —45° C. and 20° C., drying, and calendering the coated sheet.

15. A method of producing mineral-coated paper which comprises coating at least one side of a paper sheet with an aqueous dispersion of 40% to 70% total solids concentration, having a pH of 8.5 to 9.5, and containing a pigment comprising a predominant proportion of clay and 12% to 20%, on the total weight of the pigment, of a salt of a copolymer of at least one lower alkyl acrylate in which the alkyl group has from 1 to 4 carbon atoms with 4% to 7% by weight in the copolymer of at least one acid selected from acrylic acid and methacrylic acid, said copolymer having a $T_i$ value between —10° C. and 10° C.

References Cited in the file of this patent

UNITED STATES PATENTS

| | | |
|---|---|---|
| 2,583,274 | Niles | Jan. 22, 1952 |
| 2,661,308 | Azorlosa | Dec. 1, 1953 |
| 2,685,538 | Stinchfield | Aug. 3, 1954 |

OTHER REFERENCES

Ser. No. 337,664, Haakh (A. P. C.), published May 11, 1943.